United States Patent
Kijlstra et al.

(10) Patent No.: US 7,588,627 B2
(45) Date of Patent: Sep. 15, 2009

(54) PROCESS FOR THE REMOVAL OF $H_2S$ AND MERCAPTANS FROM A GAS STREAM

(75) Inventors: Wiebe Sjoerd Kijlstra, Amsterdam (NL); Josephus Norbertus Johannes Jacobus Lammers, Heemstede (NL); Clas Ingemar Wernersson, Gothenburg (SE)

(73) Assignee: Shell Oil Company, Houston, TX (US)

( * ) Notice: Subject to any disclaimer, the term of this patent is extended or adjusted under 35 U.S.C. 154(b) by 691 days.

(21) Appl. No.: 10/553,366

(22) PCT Filed: Apr. 13, 2004

(86) PCT No.: PCT/EP2004/050506
§ 371 (c)(1), (2), (4) Date: Oct. 13, 2005

(87) PCT Pub. No.: WO2004/091754
PCT Pub. Date: Oct. 28, 2004

(65) Prior Publication Data
US 2006/0188424 A1 Aug. 24, 2006

(30) Foreign Application Priority Data
Apr. 17, 2003 (EP) ................... 03252485

(51) Int. Cl.
*B01D 53/14* (2006.01)
(52) U.S. Cl. .............. 95/187; 95/199; 95/235; 423/243.01
(58) Field of Classification Search ............ 95/181, 95/187, 199, 235; 423/243.01, 242.1, 232; 585/834, 833; 422/168
See application file for complete search history.

(56) References Cited
U.S. PATENT DOCUMENTS
4,562,300 A * 12/1985 LaFoy ................. 585/854

5,087,195 A * 2/1992 Nakanishi et al. ........... 431/309
(Continued)

FOREIGN PATENT DOCUMENTS
EP 229587 7/1987
(Continued)

OTHER PUBLICATIONS
Intl Search Report dated Aug. 13, 2004 (PCT/EP2004/050506).
(Continued)

*Primary Examiner*—Duane Smith
*Assistant Examiner*—Ives Wu
(74) *Attorney, Agent, or Firm*—Charles W. Stewart

(57) ABSTRACT

The invention relates to a process for the removal of, $H_2S$ and mercaptans from a gas stream comprising these compounds, which process comprises the steps of: (a) removing $H_2S$ from the gas stream by contacting the gas stream in a H2S-removal zone with a first aqueous alkaline washing liquid to obtain a $H_2S$-depleted gas stream and a sulphide-comprising aqueous stream; (b) removing mercaptans from the $H_2S$-depleted gas stream obtained in step (a) by contacting the $H_2S$-depleted gas stream in a mercaptan-removal zone with a second aqueous alkaline washing liquid to obtain a mercaptan-depleted gas stream and an thiolate—comprising aqueous stream; (c) contacting the combined aqueous streams comprising sulphide and thiolates obtained in step (a) and step (b) with sulphide-oxidizing bacteria in the presence of oxygen in an oxidation reactor to obtain a sulphur slurry and a regenerated aqueous alkaline washing liquid; (d) separating at least part of the sulphur slurry obtained in step (c) from the regenerated aqueous alkaline washing liquid; and (e) recycling the regenerated aqueous alkaline washing liquid to the $H_2S$-removal zone in step (a) and to the mercaptan-removal zone in step (b). The invention further relates to a gas-treating unit for the removal of $H_2S$ and mercaptans and from a gas stream comprising these compounds in a process according to the invention.

8 Claims, 1 Drawing Sheet

U.S. PATENT DOCUMENTS

| | | | | |
|---|---|---|---|---|
| 5,298,174 A | * | 3/1994 | Momont et al. | 210/761 |
| 5,354,545 A | * | 10/1994 | Buisman | 423/242.1 |
| 5,450,892 A | * | 9/1995 | Gautreaux, Jr. | 162/16 |
| 5,659,109 A | * | 8/1997 | Fernandez de la Vega et al. | 585/834 |
| 5,976,868 A | | 11/1999 | Buisman | 435/266 |
| 6,306,288 B1 | | 10/2001 | Pittman et al. | 208/235 |

FOREIGN PATENT DOCUMENTS

| | | |
|---|---|---|
| EP | 0845288 | 6/1998 |
| JP | 2003 027068 | 1/2003 |
| NL | 8801009 | 11/1989 |
| WO | 92/10270 | 6/1992 |
| WO | 94/29227 | 12/1994 |
| WO | 96/30110 | 10/1996 |

OTHER PUBLICATIONS

Intl Preliminary Report on Patentability (PCT/EP2004/050506), Aug. 8, 2005.

Perry's Chemical Engineers' Handbook, $7^{th}$ edition, section 14, 1997.

Perry's Chemical Engineers' Handbook, $7^{th}$ edition, section 22, 1997.

* cited by examiner

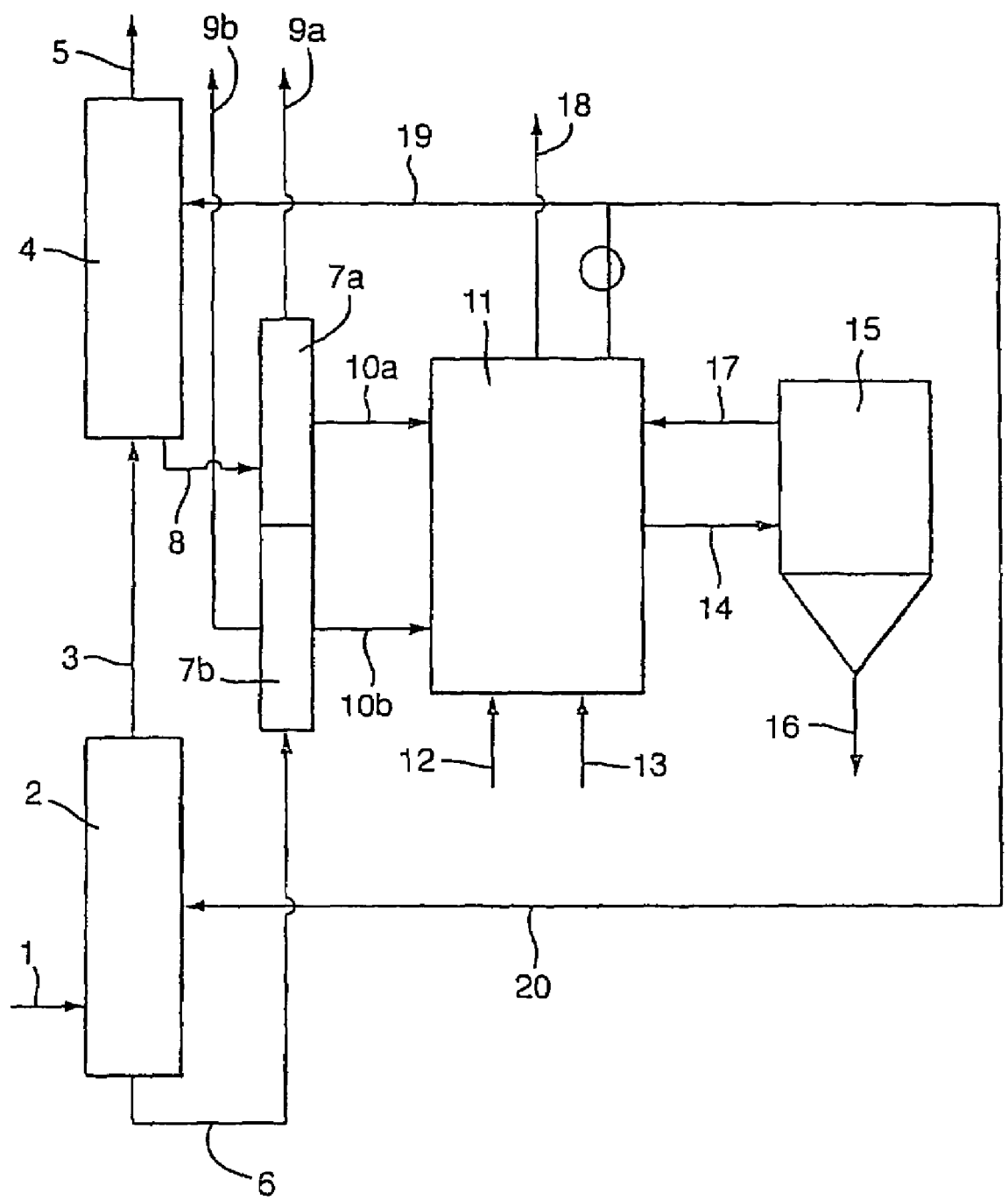

PROCESS FOR THE REMOVAL OF H$_2$S AND MERCAPTANS FROM A GAS STREAM

PRIORITY CLAIM

The present application claims priority to European Patent Application No. 03252485.2 filed Apr. 17,2003.

The invention relates to a process for removing H$_2$S and mercaptans from a gas stream comprising these compounds.

The invention further relates to a gas-treating unit for the removal of H$_2$S and mercaptans from a gas stream comprising these compounds in a process according to the invention.

The removal of H$_2$S and mercaptans (thiols) from a gas stream comprising these compounds is of considerable importance, because the toxicity and smell of H$_2$S and mercaptans renders their presence highly undesirable. Moreover, H$_2$S is very corrosive to the gas pipeline network. In view of the increasingly stringent environmental requirements, removal of H$_2$S and mercaptans has become even more important.

A number of processes are known in the art for the removal of H$_2$S from gas streams. These processes are based on physical and/or chemical absorption, chemical reaction and/or solid bed adsorption. Physical and/or chemical absorption processes, often using aqueous alkaline solutions, usually are able to remove the H$_2$S to a large extent. In some cases even complete removal of the H$_2$S is attained. However, the removal of mercaptans to a low level in a gas stream wherein both mercaptans and H$_2$S are present is much more difficult. Chemically reacting processes in general are able to remove H$_2$S without large difficulties; however, they suffer from the drawback that they do not effectively remove mercaptans, sulphides and disulfides and often produce large amounts of useless waste (such as non-regenerable adsorbents).

Processes known in the art include treating sulphur compounds-containing gas streams with an alkaline aqueous liquid, as described for instance in EP 229,587. According to that process sulphide absorbed in that aqueous liquid is oxidised to elemental sulphur in the presence of a catalyst. A drawback of this method is the loss of catalyst and the high operational costs in view of the oxidation that takes place under pressure. In WO 92/10270, a process is described for the removal of sulphur compounds from gases wherein the gas is washed with an alkaline aqueous washing liquid and the washing liquid is subjected to sulphide-oxidising bacteria. The process described in WO 92/10270 is said to be suitable for the removal of alkane thiols as well. However, it has been found that the removal of mercaptans in the process according to WO 9/10270 can be significantly improved.

We have now found a relatively simple and inexpensive process to remove both H$_2$S and mercaptans from a gas stream comprising these compounds.

The invention provides a process for the removal of H$_2$S and mercaptans from a gas stream comprising these compounds, which process comprises the steps of:
(a) removing H$_2$S from the gas stream by contacting the gas stream in a H$_2$S-removal zone with a first aqueous alkaline washing liquid to obtain a H$_2$S-depleted gas stream and a sulphide-comprising aqueous stream;
(b) removing mercaptans from the H$_2$S-depleted gas stream obtained in step (a) by contacting the H$_2$S-depleted gas stream in a mercaptan-removal zone with a second aqueous alkaline washing liquid to obtain a mercaptan-depleted gas stream and a thiolate-comprising aqueous stream;
(c) contacting the combined aqueous streams comprising sulphide and thiolates obtained in step (a) and step (b) with sulphide-oxidizing bacteria in the presence of oxygen in an oxidation reactor to obtain a sulphur slurry and a regenerated aqueous alkaline washing liquid;
(d) separating at least part of the sulphur slurry obtained in step (c) from the aqueous alkaline washing liquid; and
(e) recycling the regenerated aqueous alkaline washing liquid to the H$_2$S-removal zone in step (a) and to the mercaptan-removal zone in step (b).

The invention allows the optimisation of mercaptan removal since the conditions of the H$_2$S-removal may be selected differently from those of the mercaptan removal. Moreover the separation of H$_2$S and mercaptants allows the addition of fresh alkaline liquid to the mercaptan-removal step. It also allows the contact between mercaptans and alkaline liquid of different alkalinity, if so desired, from the alkalinity of the contact of H$_2$S and alkaline liquids. This all allows a more effective mercaptan removal.

The invention further provides a gas-treating unit for the removal of H$_2$S and mercaptans from a gas stream comprising these compounds in a process according to the invention, the gas treating unit comprising at least two gas scrubbers with inlets and outlets, at least one oxidation reactor with inlets and outlets and a solid/liquid separator with an inlet and outlets, the first gas scrubber having a discharge line for gas debouching into the inlet of the second gas scrubber, the first and the second gas scrubbers both having a discharge line for liquid debouching into the oxidation reactor, optionally via a first and a second flash vessel, respectively, the oxidation reactor having an outlet debouching into the inlet of the solid/liquid separator, an outlet for liquid debauching into the inlets of the first gas scrubber and the second gas scrubber.

In the process and gas treating unit according to the invention, H$_2$S and mercaptans are separately converted to their corresponding sulphide compounds, followed by biological oxidation of the hydrogen sulphide to elemental sulphur. The process and gas treating unit according to the invention allow the removal of both H$_2$S and mercaptans from a gas stream comprising these compounds, to levels of below 10 ppmv for H$_2$S and below 6 ppmv for mercaptans.

BRIEF DESCRIPTION OF THE DRAWINGS

The invention will now be illustrated by means of the schematic figure. The figure shows schematically a typical gas treating unit and process scheme according to the invention. A gas stream comprising H$_2$S and mercaptans is led via line 1 to a first scrubber 2 and is treated with an aqueous alkaline washing liquid to remove H$_2$S, thereby creating a H$_2$S-depleted gas stream and a sulphide-comprising aqueous stream.

After treatment in the first gas scrubber, the H$_2$S-depleted gas stream leaves the first gas scrubber via line 3 and enters a second gas scrubber 4 where it is treated with aqueous alkaline washing liquid to remove mercaptans, thereby creating a mercaptan-depleted gas stream and a thiolate-comprising aqueous stream.

After treatment in the second gas scrubber, the mercaptan-depleted gas stream leaves the second gas scrubber via line 5.

The sulphide-comprising aqueous stream is issued from the first gas scrubber via line 6 and enters a first flash vessel 7a. The thiolate-comprising aqueous stream is issued from the second scrubber via line 8 and enters a second flash vessel 7b. Hydrocarbon-containing excess gas is vented off from the flash vessels 7a and 7b via lines 9a and 9b, respectively. The liquid stream comprising sulphides and thiolates is led via lines 10a and 10b to an oxidation reactor 11 comprising sulphide-oxidising bacteria.

In the oxidation reactor 11, the sulphide compounds are oxidised. Nutrients and air are fed to the oxidation reactor 11 via feed lines 12 and 13. Part of the sulphur-containing solid/liquid mixture generated in the oxidation reactor is led via line 14 to a solid/liquid separator 15 where the solid sulphur is separated and discharged via line 16 and the liquid is led back to the oxidation reactor via line 17. Off-gas is vented from the oxidation reactor via line 18. The regenerated aqueous alkaline washing liquid, comprising sulphur particles, is led from the oxidation reactor 11 to the first gas scrubber 2 via line 20 and to the second gas scrubber 4 via line 19.

Suitable aqueous alkaline washing liquids include aqueous hydroxide solutions, e.g. sodium hydroxide or potassium hydroxide solutions in water and aqueous carbonate and bicarbonate solutions.

The gas stream may contain any amount of $H_2S$ and mercaptans compounds, but in general, the total concentration of $H_2S$ will be between 50 ppmv up to 90 vol %, preferably between 100 ppmv and 70 vol %, more preferably between 150 ppmv and 50 vol %, still more preferably between 200 ppmv and 20 vol %, based on the total gas stream. The total amount of mercaptans in the starting gas stream is typically between 10 up to 1000 ppmv, based on the total gas stream. In the case that the gas stream in addition to $H_2S$ and mercaptans also contains $CO_2$, at least part of the $CO_2$ will also be removed.

Suitably, the hydrogen sulphide load in the $H_2S$-removal zone is between 50 and 100,000 kg/day, preferably between 100 and 50,000 kg/day. A load between 100 and 50,000 kg/day offers additional advantages.

The main reactions that can take place in the $H_2S$-removal zone are:

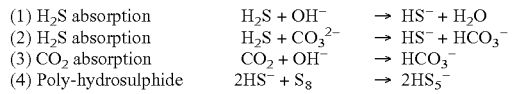

formation

The sulphide-comprising aqueous streams comprise one or more products of the main reactions 1 to 4 that can take place in the $H_2S$-removal zone, such as $HS^-$, disulphides, polysulphides, thiocarbonates and carbonates but can also include dissolved $H_2S$.

Reference herein to "$H_2S$-depleted gas stream" is to a gas stream wherein the $H_2S$ concentration is at most 100 ppmv, especially from 0.01 to 10 ppmv, suitably between 0.02 and 3.5 ppmv, preferably between 0.05 and 3 ppmv, more preferably between 0.1 and 1 ppmv, based on the total gas stream. The mercaptan concentration in the $H_2S$-depleted gas stream is typically between 10 ppmv and 0.1 vol %, based on the total $H_2S$-depleted gas stream.

The preferred temperature in the $H_2S$ removal zone is between 5 and 70° C., more preferably between 10 and 50° C., most preferably from 20 to 40° C., enabling an effective removal of $H_2S$ at relatively low temperatures. Typically, the pressure in the $H_2S$ removal zone is between 1 and 100 bar(g), suitably between 1.5 and 80 bar(g).

Reference herein to mercaptans is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. These mercaptans may be substituted by heteroatoms-containing moieties, such as carbonyl, hydroxy, amino and ether groups or more sulphur moieties.

The invention especially relates to the removal of methyl mercaptan, ethyl mercaptan, normal- and iso-propyl mercaptan and butyl mercaptan isomers.

The main reactions that can take place in the mercaptan-removal zone are:

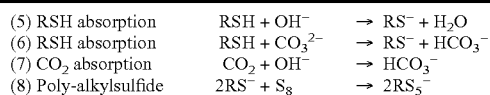

formation wherein R can be an alkyl substituent, especially methyl, ethyl, propyl or butyl or an aromatic substituent, especially phenyl, or mixtures thereof.

The thiolate-comprising aqueous streams comprise one or more products of the main reactions 5 to 8 that can take place in the mercaptan-removal zone, and can include dissolved RSH.

The preferred temperature in the mercaptan removal zone is between 5 and 70° C., more preferably between 10 and 50° C., enabling an effective removal of RSH at relatively low temperatures. Typically, the pressure in the mercaptan removal zone is between 1 and 100 bar(g), suitably between 1.5 and 80 bar(g).

Typically, a gas/liquid contactor is used as the $H_2S$ removal zone and/or the mercaptan removal zone. Suitable gas/liquid contactors are described in Perry's Chemical Engineers' Handbook, 7$^{th}$ edition, section 14 (1997) and include for example a tray or packed column or a gas scrubber.

The mercaptan-depleted gas stream can be processed further in known manners, for example by catalytic or non-catalytic combustion, to generate electricity, heat or power, or as a feed gas for a chemical reaction or for residential use.

Due to their odorous nature, $H_2S$, mercaptans, sulphides, disulphides and aromatic mercaptans can be detected at parts per million concentration levels. Thus, it is desirable for users of such gas streams, especially in the case where the gas stream is intended for residential use, to have concentrations of total sulphur compounds in the gas stream lowered to a level which is acceptable for the intended purposes. Therefore, in the mercaptan-depleted gas stream, the concentration of total sulphur compounds is typically less than 30 ppmv, suitably less than 20 ppmv, preferably less than 10 ppmv, especially between 0.01 and 10 ppmv, preferably between 0.05 and 3.5 ppmv, more preferably between 0.1 and 1 ppmv, based on the total mercaptan-depleted gas stream. The concentration of mercaptan compounds is preferably lowered to e.g. less than 6 ppmv, or less than 4 ppmv, preferably less than 2 ppmv, based on the total mercaptan-depleted gas stream.

Optionally, the washing liquid of the $H_2S$ removal zone or the washing liquid of the mercaptan removal zone is buffered, or both washing liquids are buffered. Preferred buffering compounds are carbonates, bicarbonates phosphates and mixtures thereof, especially sodium carbonate and/or sodium bicarbonate.

The concentration of the buffering compounds depends inter alia on the composition of the gas flow and is generally adjusted in such a way, that the washing liquid is kept within the preferred pH range.

Typically, the pH of the washing liquid in the $H_2S$ removal zone is suitably buffered at a pH of between 4.5 and 10, more preferably between 5.5 and 9, most preferably from 7 to 9.

Typically, the pH of the washing liquid in the mercaptan removal zone is suitably higher than the pH of the washing liquid in the H$_2$S removal zone and is preferably buffered at a pH of between 5.5 and 10, more preferably between 6.5 and 9, most preferably from 7.5 to 9. The desired alkalinity of the alkaline washing liquids can be adjusted by adding make-up liquid with the appropriatel alkalinity.

In the oxidation reactor, the microbiological formation of sulphur and sulphate takes place. The main reactions are:

| | | |
|---|---|---|
| (9a) Sulphur | RS$^-$ + ½ O$_2$ | → ⅛S$_8$ + RO$^-$ |
| (9b) production | HS$^-$ + ½ O$_2$ | → ⅛S$_8$ + OH$^-$ |
| (9c) Sulphur | RS$_5^-$ + ½ O$_2$ | → ⅝S$_8$ + RO$^-$ |
| (9d) production | HS$_5^-$ + ½ O$_2$ | → ⅝S$_8$ + OH$^-$ |
| (10a) Sulphate | RS$^-$ + 2O$_2$ + OH$^-$ | → SO$_4^{2-}$ + ROH |
| (10b) production | HS$^-$ + 2O$_2$ + OH$^-$ | → SO$_4^{2-}$ + H$_2$O |

The amount of oxygen fed into the oxidation reactor is adjusted such that the oxidation of absorbed sulphide and thiolate results predominantly in sulphur, as suggested in NL 8801009, disclosing a process for the for the controlled oxidation of sulphur-containing waste water.

Hence, the regenerated aqueous alkaline washing liquid comprises sulphur particles.

Reference herein to sulphide-oxidising bacteria is to bacteria which can oxidise sulphide to elemental sulphur. Suitable sulphide-oxidising bacteria can be selected for instance from the known autotropic aerobic cultures of the genera Thiobacillus and Thiomicrospira.

Typical pressures in the oxidation reactor are between 0.5 and 2 bar(g).

Preferably, the reaction medium in the oxidation reactor is buffered. The buffering compounds are chosen in such a way that they are tolerated by the bacteria present in the oxidation reactor. Preferred buffering compounds are carbonates, bicarbonates phosphates and mixtures thereof, especially sodium carbonate and/or sodium bicarbonate. The concentration of the buffering compounds depends inter alia on the composition of the gas flow and is generally adjusted in such a way, that the pH of the reaction medium in the oxidation reactor is between 6 and 12, preferably between 7 and 11, more preferably between 8 and 10.

At least part of the aqueous sulphur slurry obtained from the process in the oxidation reactor is separated from the regenerated aqueous alkaline washing liquid. The phrase "at least part of" as used herein also includes a complete separation of sulphur from the regenerated aqueous alkaline liquid. It is further to indicate that between 1 and 99 w/w %, typically between 5 and 95 w/w %, preferably between 10 and 90 w/w % of the sulphur is separated, based on the weight of the slurry. Typically, a small amount of sulphur particles is led back to the H$_2$S removal zone and to the mercaptan removal zone as part of the regenerated washing liquid.

Suitably, the separating step takes place in a solid/liquid separator. Suitable solid/liquid separators are described in Perry's Chemical Engineers' Handbook, 7$^{th}$ edition, section 22 (1997).

Typically, the sulphur content of the separated aqueous sulphur slurry is between 5 w/w % and 50 w/w %, based on the slurry. Typically, the water of the sulphur slurry is removed to an extent that a sulphur cake with a dry solids content of between 55 and 70% is obtained. Typically, the sulphur purity of the sulphur cake is between 90 and 98 w/w %, based on the dry weight of the sulphur cake. Optionally, the sulphur cake can be re-slurried, filtered and dried to obtain a sulphur paste with a purity of at least 95 wt % sulphur, preferably at least 99 wt % sulphur. The sulphur paste thus-obtained can optionally be dried to produce a powder with a dry weight content of at least 85%, preferably at least 90%. This powder can suitably be applied as a fungicide, a fertilizer or as a miticide.

The regenerated aqueous alkaline washing liquid is recycled to the H$_2$S-removal zone and to the mercaptan-removal zone. By recycling the regenerated aqueous alkaline washing liquid separately to the mercaptan-removal zone fresh aqueous alkaline washing liquid is supplied to the mercaptan-removal zone for the removal of the mercaptans. This enhances the removal of mercaptans, e.g. to a level of 6 ppmv or less. In a preferred embodiment, the regenerated aqueous alkaline washing liquid is recycled to the H$_2$S-removal zone and to the mercaptan-removal zone from the oxidation reactor. The regenerated aqueous alkaline washing liquid issued from the oxidation reactor comprises sulphur particles, said sulphur particles enhancing the removal of H$_2$S and mercaptans in the H$_2$S-removal zone and mercaptan-removal zone, respectively.

The process according to the invention is especially suitable for the treatment of a gaseous hydrocarbon stream, especially a natural gas stream, an associated gas stream, or a refinery gas stream. Natural gas is a general term that is applied to mixtures of inert and light hydrocarbon components that are derived from natural gas wells. The main component of natural gas is methane. Further, often ethane, propane and butane are present. In some cases (small) amounts of higher hydrocarbons may be present, often indicated as natural gas liquids or condensates. Inert compounds may be present, especially nitrogen, carbon dioxide and, occasionally, helium. When CO$_2$ is present, also at least part of the CO$_2$ will be removed. When produced together with oil, the natural gas is usually indicated as associated gas. H$_2$S, mercaptans, sulphides, disulfides, thiophenes and aromatic mercaptans may be present in natural gas in varying amounts. Refinery streams concern crude oil derived gaseous hydrocarbon streams containing smaller or larger amounts of sulphur compounds. Recycle streams and bleed streams of hydro treatment processes, especially hydrodesulphurisation processes, can also suitably be treated by the process according to the invention.

Especially in the case of natural and associated gas, a considerable amount of the total amount of sulphur compounds is formed by H$_2$S. Amounts of up to 10 or even 20 vol % of H$_2$S may be present. Further smaller or larger amounts of carbon dioxide may be present. Sometimes amounts of up to 10 or even 20 vol % or even more of carbon dioxide may be present. Suitably the gas stream comprises H$_2$S and optionally carbon dioxide up to 2 vol %, more preferably up to 0.5 vol %.

In a typical gas-treating unit according to the invention the pressure in the first gas scrubber is between 1 and 100 bara, preferably between 2 and 80 bara. The temperature in the first gas scrubber is typically between 10 and 50° C., preferably between 20 and 40° C.

The first gas scrubber has a gas outlet connected to a gas discharge line, through which H$_2$S-depleted gas leaves the scrubber and is led to the inlet of a second gas scrubber.

The sulphide-comprising aqueous liquid is removed from the first gas scrubber via an outlet connected to a liquid discharge line and led to the inlet of an oxidation reactor, optionally via a first flash vessel.

The second gas scrubber has a gas outlet, through which mercaptan-depleted gas leaves the scrubber via a gas discharge line and a liquid outlet, through which thiolate-comprising aqueous liquid is led from the scrubber via a liquid discharge line to the oxidation reactor, optionally via a second flash vessel.

Optionally, the first and second gas scrubber may be placed on top of each other in one vessel.

In a preferred embodiment the oxidation reactor has an outlet through which a sulphur slurry is led to a solid/liquid separator and an outlet through which regenerated aqueous alkaline washing liquid is led via discharge lines to the first gas scrubber and to the second gas scrubber.

The invention will now be illustrated by way of the following non-limiting examples.

Experiments are conducted for the removal of $H_2S$ and mercaptans from a natural gas stream comprising these compounds. In a gas treating unit and process scheme as depicted in the figure, the flow rate of the gas stream is measured and the solvent flow rate is kept at a fixed value.

In the comparative examples, the gas stream is contacted with aqueous alkaline washing liquid in one gas scrubber. The amount of $H_2S$, mercaptans and $CO_2$ of the gas stream is measured prior to entering the gas scrubber and after leaving the gas scrubber.

In the examples according to the invention, the gas stream is treated in a process according to the invention. The amount of $H_2S$, mercaptans and $CO_2$ of the gas stream is measured prior to entering the $H_2S$ removal zone and after leaving the mercaptan removal zone.

EXAMPLE 1 COMPARATIVE

Flow rate of the natural gas stream: 180,000 $Nm^3$/day, pressure in the gas scrubber: 50 bar(g). Gas stream prior to entering the gas scrubber: 0.5 vol % $H_2S$, 2 vol % $CO_2$ and 25 ppmv RSH. Gas stream leaving the gas scrubber: $H_2S$ below 3 ppmv, RSH 14.7 ppmv.

EXAMPLE 2 ACCORDING TO THE INVENTION

Flow rate of the natural gas stream: 180,000 $Nm^3$/day, pressure in the gas scrubber: 50 bar(g). Gas stream prior to entering $H_2S$ removal zone: 0.5 vol % $H_2S$, 2 vol % $CO_2$ and 25 ppmv RSH. Gas stream leaving the mercaptan removal zone: $H_2S$ below 3 ppmv, RSH 3.4 ppmv.

EXAMPLE 3 COMPARATIVE

Flow rate of the natural gas stream: 400,000 $Nm^3$/day, pressure: 65 bar(g). Gas stream prior to entering the gas scrubber: 1 vol % $H_2S$, 1 vol % $CO_2$, 30 ppmv RSH. Gas stream leaving the gas scrubber: $H_2S$ below 3 ppmv, RSH 25.9 ppmv.

EXAMPLE 4 ACCORDING TO THE INVENTION

Flow rate of the natural gas stream: 400,000 $Nm^3$/day, pressure: 65 bar(g). Gas stream prior to entering the $H_2S$ removal zone: 1 vol % $H_2S$, 1 vol % $CO_2$, 30 ppmv RSH. Gas stream leaving the mercaptan removal zone: $H_2S$ below 3 ppmv, RSH 4.1 ppmv.

From the examples it is apparent that the process according to the invention results in a much lower level of mercaptans in the resulting gas than the comparative process.

That which is claimed is:

1. A process for the removal of $H_2S$ and mercaptans from a gaseous hydrocarbon stream comprising these compounds, which process comprises the steps of:
    (a) removing $H_2S$ from the gaseous hydrocarbon stream by contacting the gaseous hydrocarbon stream in a $H_2S$-removal zone with a first aqueous alkaline washing liquid buffered at a pH between 4.5 and 10, at a temperature between 5 and 70° C. and a pressure between 1 and 100 bar, to obtain a $H_2S$-depleted gas stream and a sulphide-comprising aqueous stream;
    (b) removing mercaptans from the $H_2S$-depleted gas stream obtained in step (a) by contacting the $H_2S$-depleted gas stream in a mercaptan-removal zone with a second aqueous alkaline washing liquid buffered at a pH between 5.5 and 10, at a temperature between 5 and 70° C. and a pressure between 1 and 100 bar, wherein the pH of the aqueous alkaline washing liquid in the mercaptan-removal zone is higher than the pH of the aqueous washing liquid in the $H_2S$-removal zone, to obtain a mercaptan-depleted gas stream and an thiolate-comprising aqueous stream, said mercaptan-depleted gas stream having a level of $H_2S$ below 10 ppmv and a level of mercaptans below 6 ppmv;
    (c) contacting the combined aqueous streams comprising sulphide and thiolates obtained in step (a) and step (b) with sulphide-oxidizing bacteria in the presence of oxygen in an oxidation reactor to obtain a sulphur slurry and a regenerated aqueous alkaline washing liquid;
    (d) separating at least part of the sulphur slurry obtained in step (c) from the regenerated aqueous alkaline washing liquid; and
    (e) recycling the regenerated aqueous alkaline washing liquid from the oxidation reactor to the $H_2S$-removal zone in step (a) and to the mercaptan-removal zone in step (b).

2. A process according to claim 1, wherein the aqueous alkaline washing liquid in step (a) is buffered at a pH between 5.5 and 9.

3. A process according to claim 2, wherein the aqueous alkaline washing liquid in step (b) is buffered at a pH between 7.5 and 9.

4. A process according to claim 3, wherein the contents of the oxidation reactor in step (c) is buffered at a pH between 8 and 10.

5. A process according to 4, wherein the $H_2S$ concentration of the gas stream entering the $H_2S$-removal zone in step (a) is between 150 ppmv and 50 vol %.

6. A process according to claim 5, wherein the $H_2S$ concentration of the $H_2S$-depleted gas stream is between 0.02 and 3.5 ppmv, based on the total gas stream.

7. A process according to claim 6, wherein the concentration of mercaptan compounds in the mercaptan-depleted gas stream is less than 4 ppmv, based on the total mercaptan-depleted gas stream.

8. A process according to claim 1, wherein the concentration of total sulphur compounds in the mercaptan-depleted gas stream is between 0.05 and 3.5 ppmv and the concentration of mercaptan compounds in the mercaptan-depleted gas stream is less than 2 ppmv, based on the total mercaptan-depleted gas stream.

* * * * *